US012687407B2

(12) United States Patent
Byun et al.

(10) Patent No.: US 12,687,407 B2
(45) Date of Patent: Jul. 21, 2026

(54) SENSING APPARATUS FOR DETECTING INTENSITY OF AN EXTERNAL MAGNETIC FIELD AND COMPENSATING FOR AN AMOUNT OF CHANGE OF A SENSOR OUTPUT

(71) Applicant: LG INNOTEK CO., LTD., Seoul (KR)

(72) Inventors: Sung Wook Byun, Seoul (KR); Chang Hwan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 314 days.

(21) Appl. No.: 18/563,993

(22) PCT Filed: Apr. 7, 2022

(86) PCT No.: PCT/KR2022/005035
§ 371 (c)(1),
(2) Date: Nov. 24, 2023

(87) PCT Pub. No.: WO2023/277312
PCT Pub. Date: Jan. 5, 2023

(65) Prior Publication Data
US 2024/0255310 A1     Aug. 1, 2024

(30) Foreign Application Priority Data

Jun. 28, 2021     (KR) ........................ 10-2021-0083797

(51) Int. Cl.
*G01D 5/14* (2006.01)
*G01L 3/10* (2006.01)

(52) U.S. Cl.
CPC ................ *G01D 5/142* (2013.01); *G01L 3/10* (2013.01)

(58) Field of Classification Search
CPC .......... G01D 5/142; G01D 5/147; G01L 3/10; G01L 3/104; B62D 6/10; G01P 3/488
See application file for complete search history.

(56) References Cited

U.S. PATENT DOCUMENTS 8,984,964 B2 * 3/2015 Lee .......................... G01L 3/104
73/862.193
10,315,694 B2 * 6/2019 Lee .......................... G01B 7/30
(Continued)

FOREIGN PATENT DOCUMENTS

CN          211527687          9/2020
DE      102018119807 A1 *    2/2020    ............. G01L 3/104
(Continued)

OTHER PUBLICATIONS

International Search Report dated Jul. 6, 2022 issued in Application No. PCT/KR2022/005035.

*Primary Examiner* — Octavia Hollington
(74) *Attorney, Agent, or Firm* — KED & ASSOCIATES, LLP

(57) ABSTRACT

An embodiment discloses a sensing apparatus comprising: a rotor; a stator disposed corresponding to the rotor; a first collector disposed on one surface of the stator; and a second collector disposed below the first collector. The stator includes a stator tooth that includes a body and a tooth, the first collector includes a first body and a first leg, the second collector includes a second body and a second leg, the first body and the second body are separable from each other, the body of the stator tooth is located between the first body and the second body, and the first leg and the second leg do not overlap each other in an axial direction. Accordingly, the plurality of collectors, which are disposed so that the magnetic resistances are differently formed, compensate for changes in output value due to external magnetism, thus making it possible for the sensing apparatus to achieve sufficient performance.

16 Claims, 13 Drawing Sheets

(56)        References Cited

U.S. PATENT DOCUMENTS

| | | | |
|---|---|---|---|
| 12,442,661 B2 * | 10/2025 | Byun | G01D 3/028 |
| 2018/0170432 A1 | 6/2018 | Chowdhury et al. | |
| 2021/0302246 A1 * | 9/2021 | Fröhlich | G01L 3/104 |
| 2023/0314250 A1 * | 10/2023 | Fröhlich | B62D 15/0215 |
| | | | 73/862.325 |
| 2024/0383530 A1 * | 11/2024 | Byun | G01L 3/104 |
| 2024/0401987 A1 * | 12/2024 | Lee | G01D 5/2448 |

FOREIGN PATENT DOCUMENTS

| | | |
|---|---|---|
| KR | 10-2052562 | 12/2019 |
| KR | 10-2021-0034092 | 3/2021 |
| WO | WO 2020/174170 | 9/2020 |

* cited by examiner

[FIG. 1]
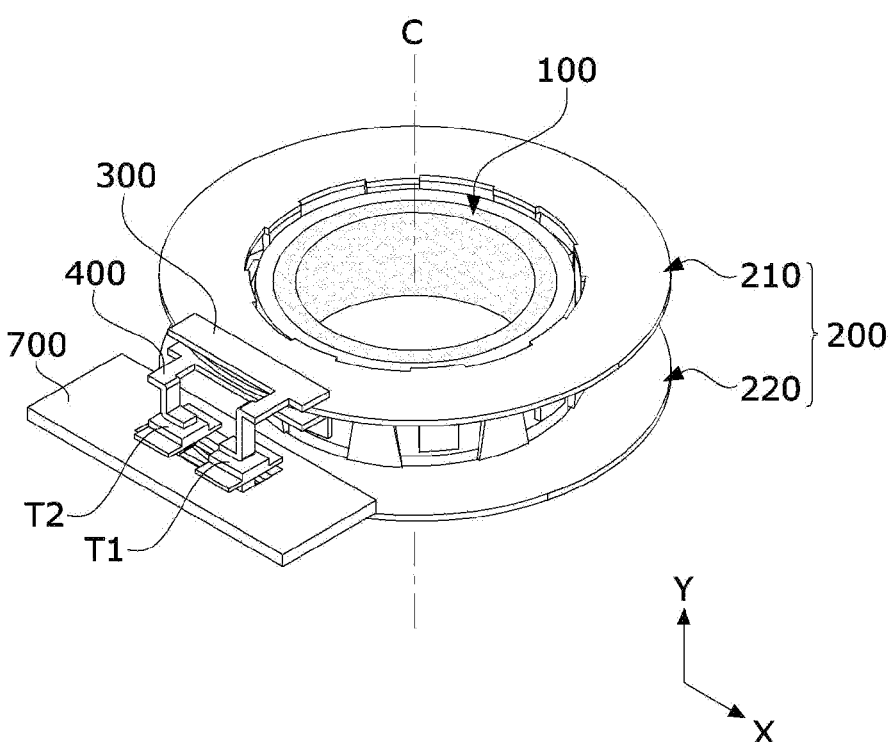

[FIG. 2]
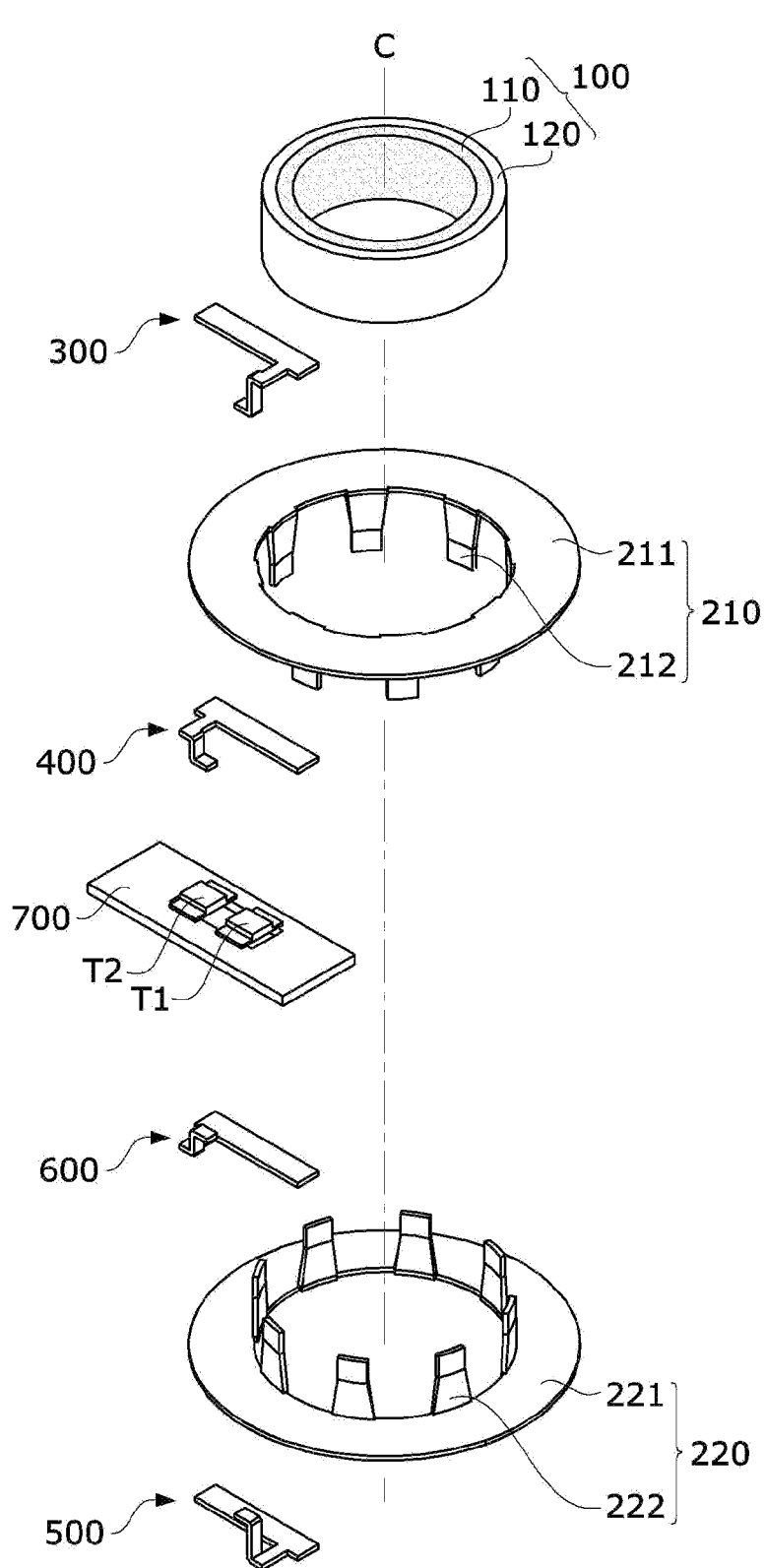

[FIG. 3]
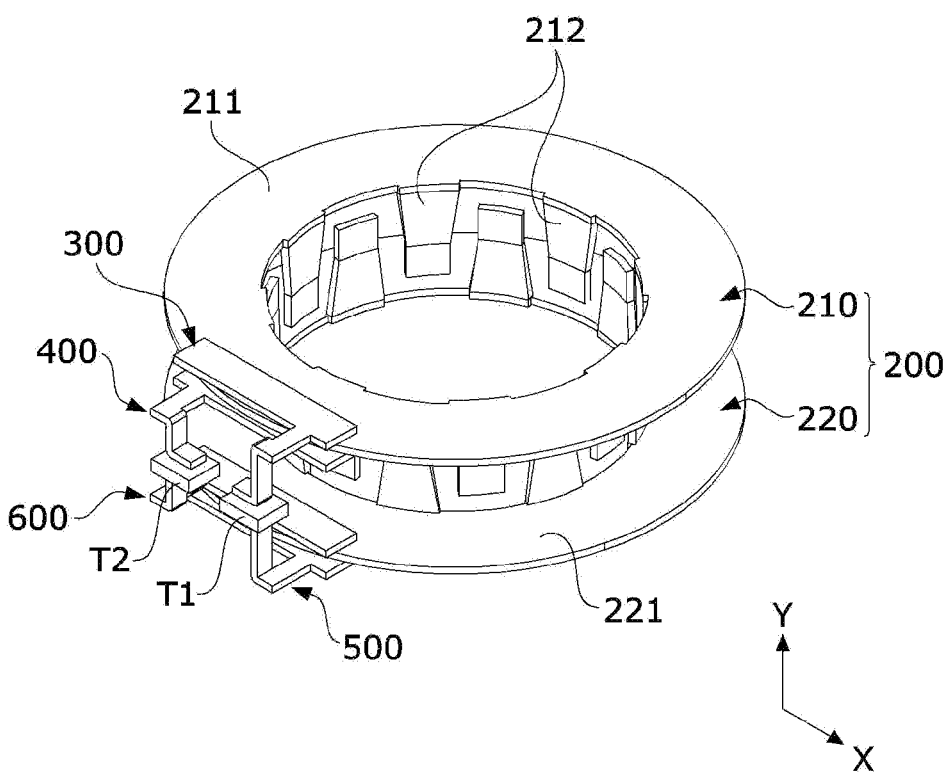
[FIG. 4]
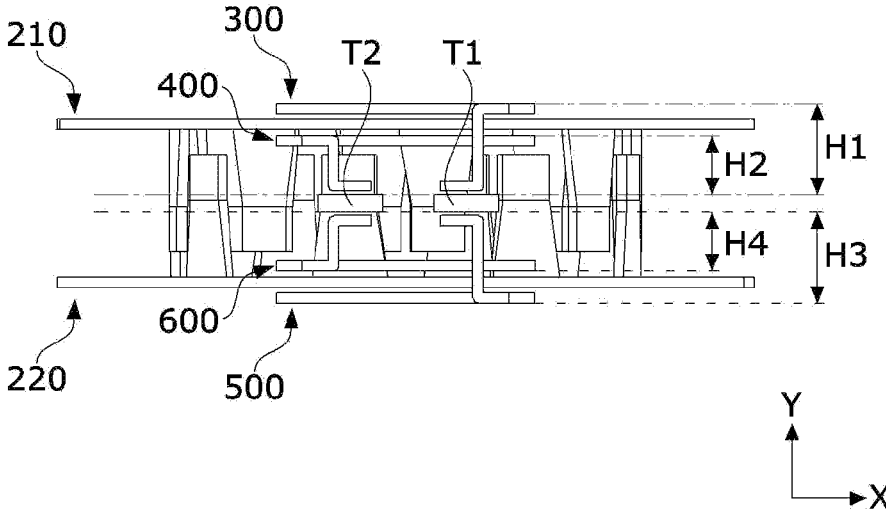

[FIG. 5]
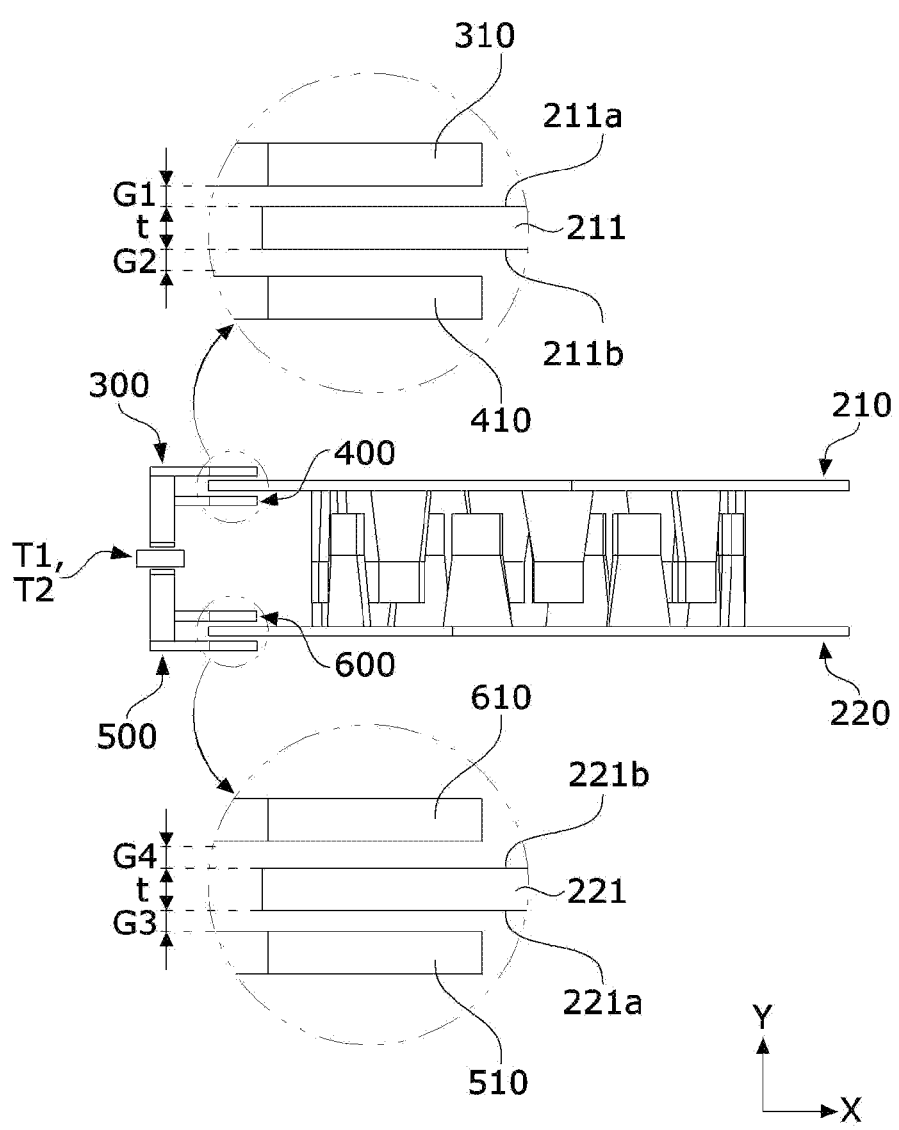

[FIG. 6]
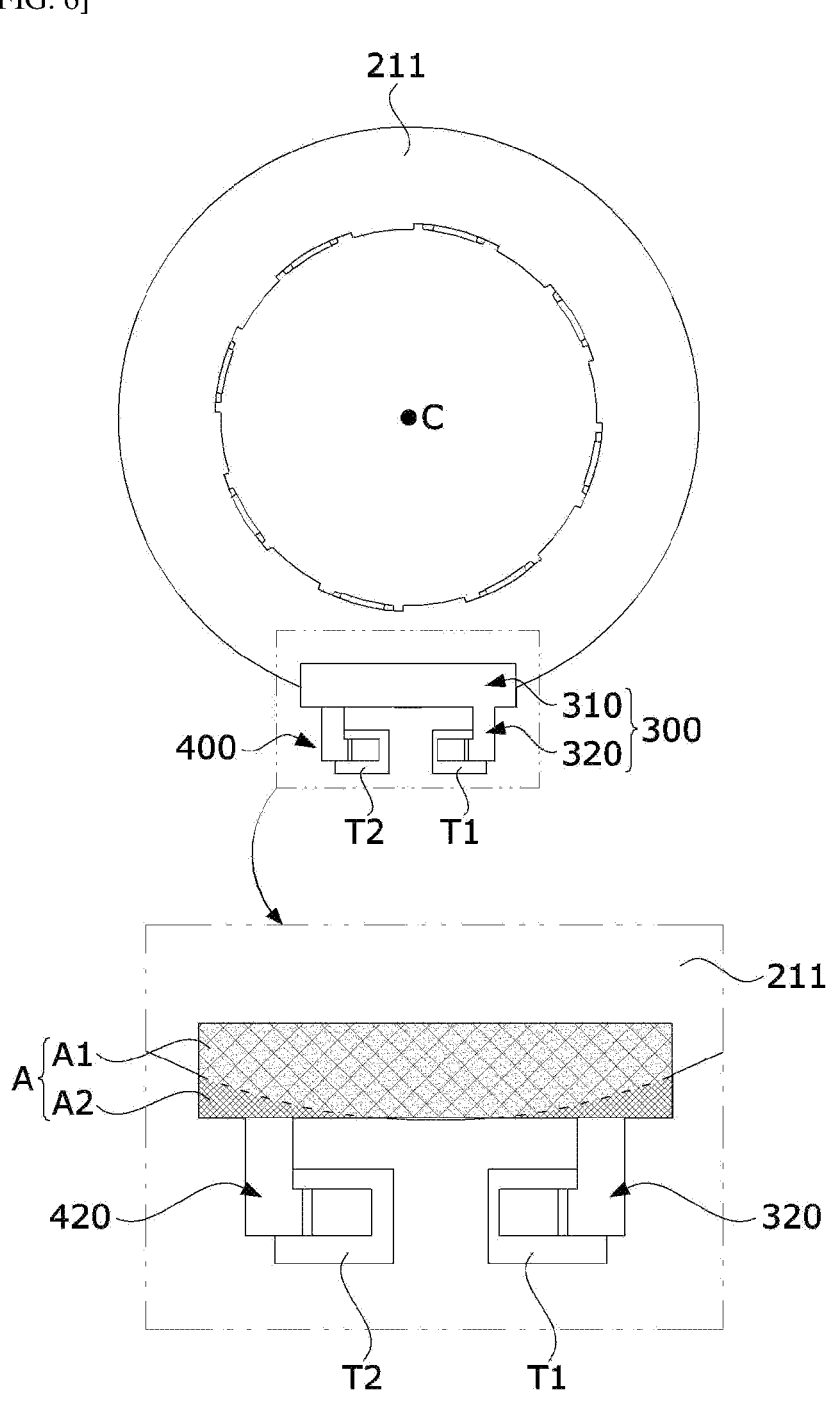

[FIG. 7]
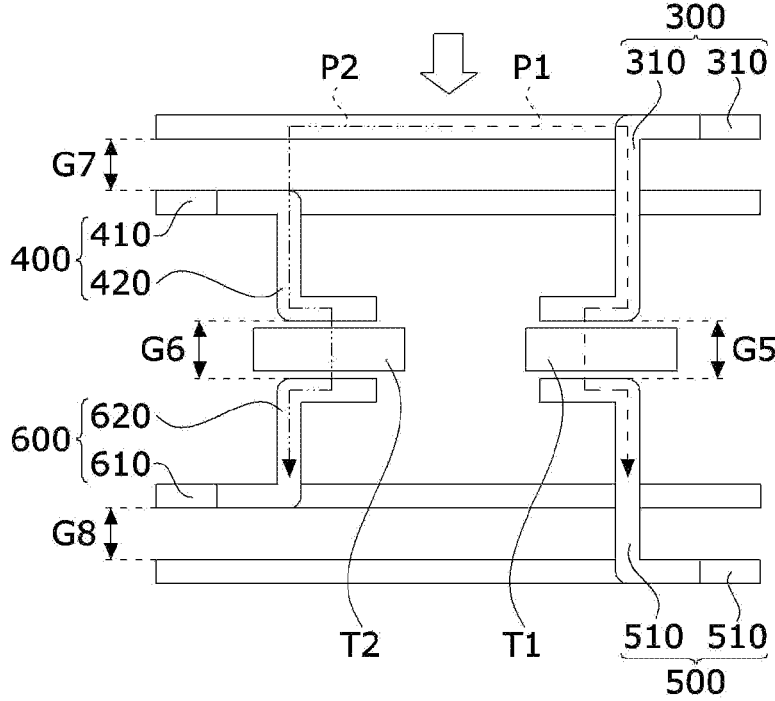
[FIG. 8]
300
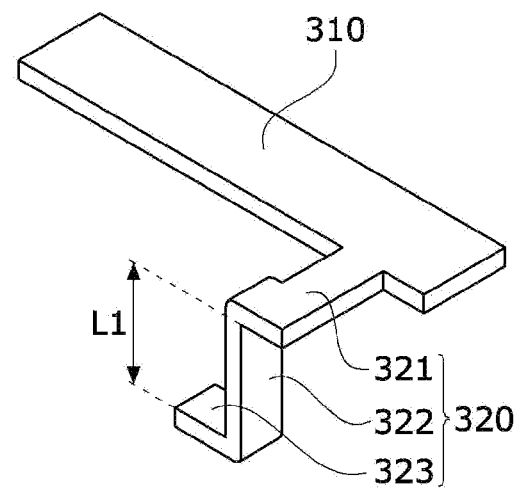

[FIG. 9]
400
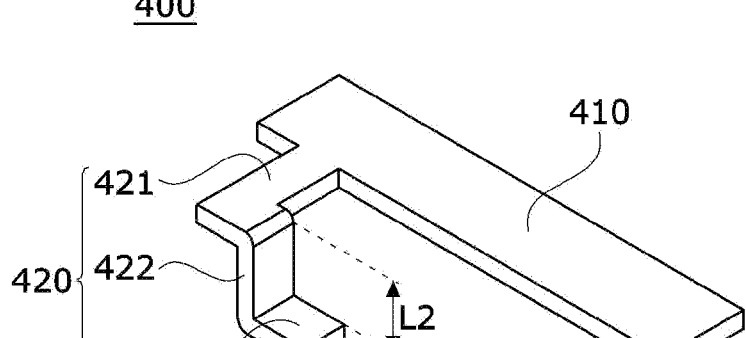
[FIG. 10]
500
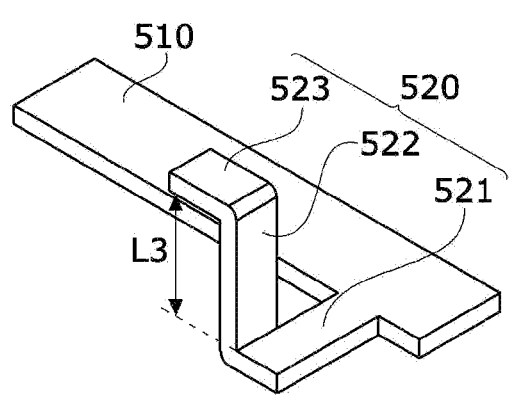
[FIG. 11]
600
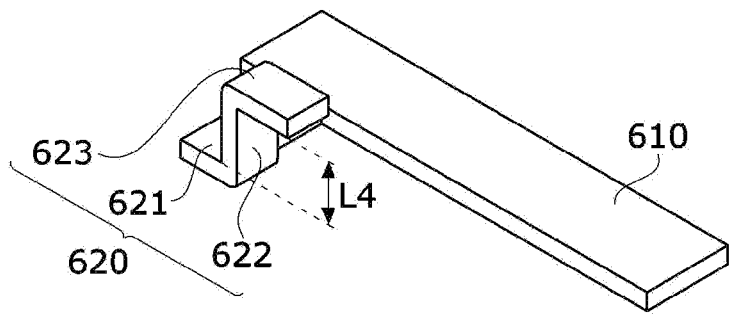

[FIG. 12A]
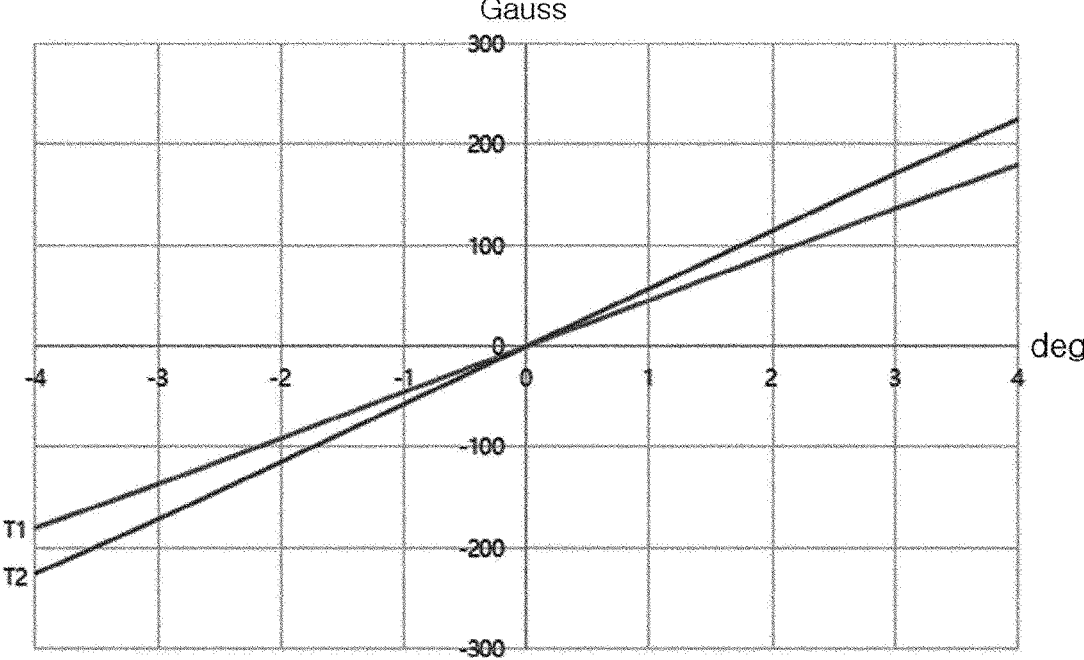
[FIG. 12B]
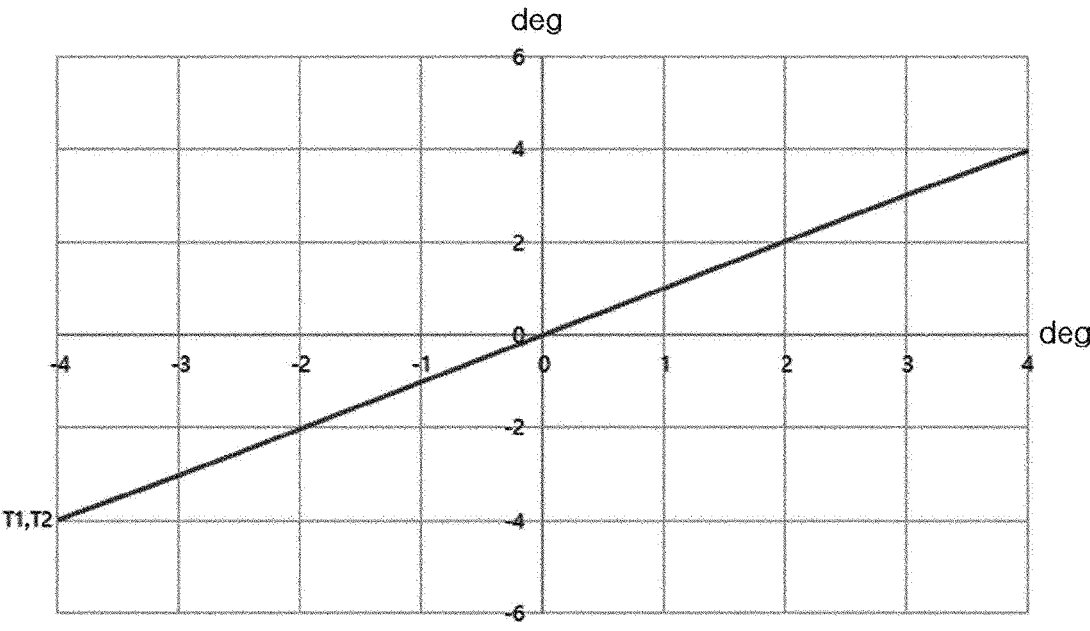

[FIG. 13A]
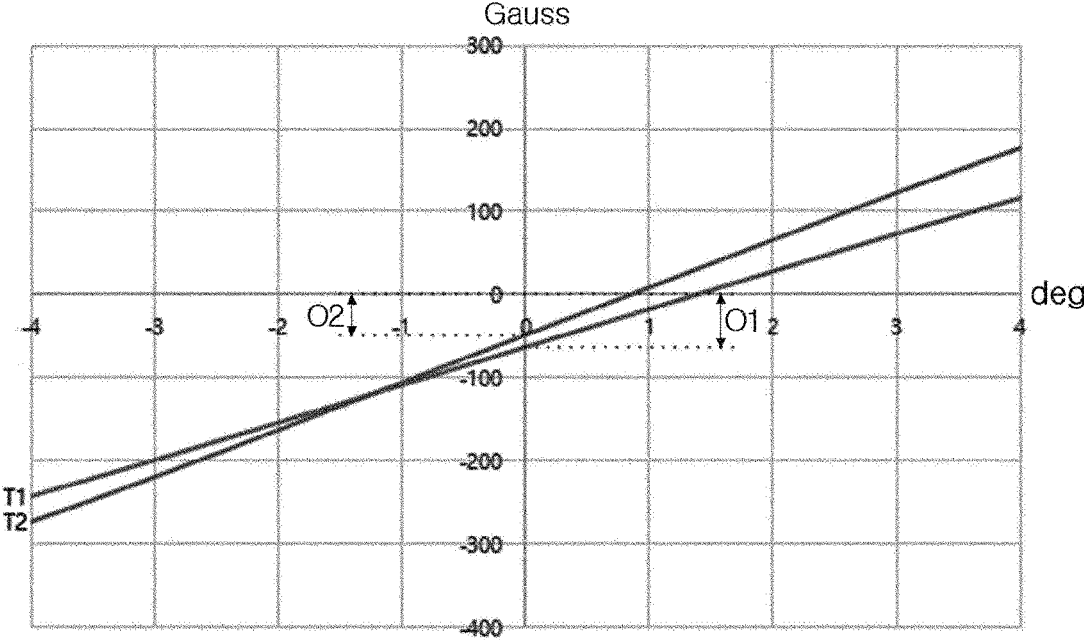
[FIG. 13B]
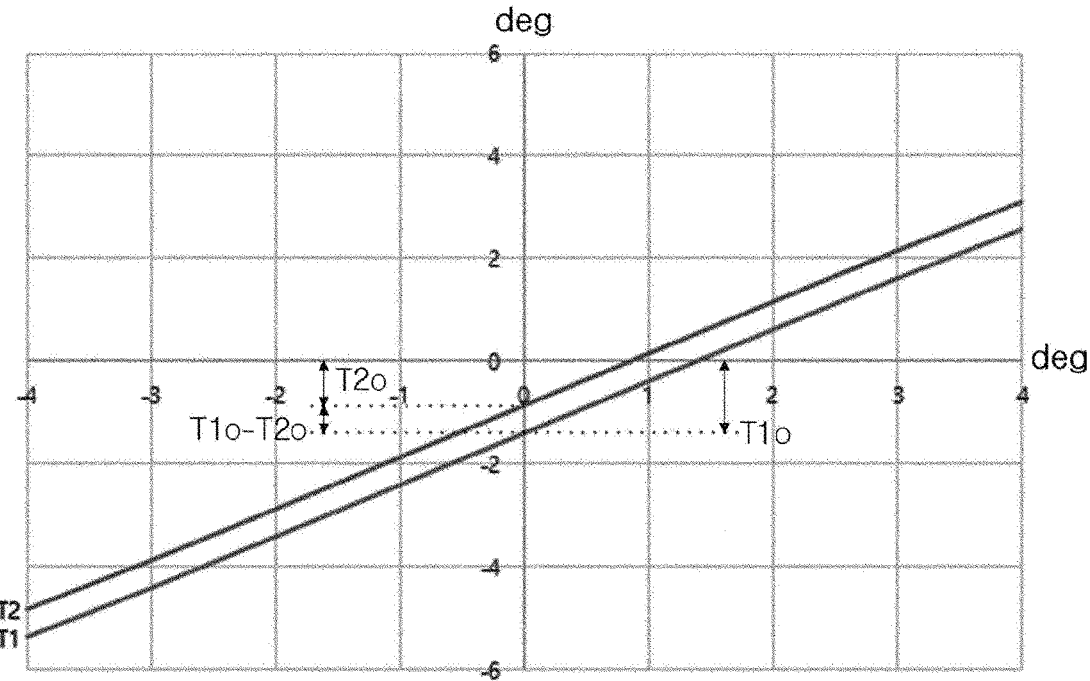

[FIG. 14A]
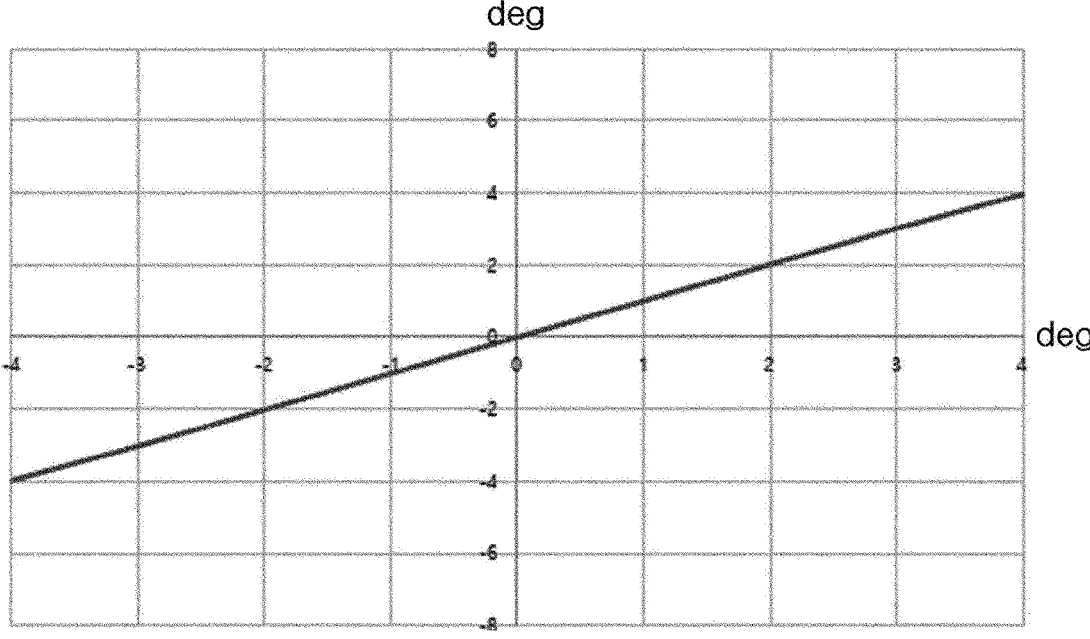
[FIG. 14B]
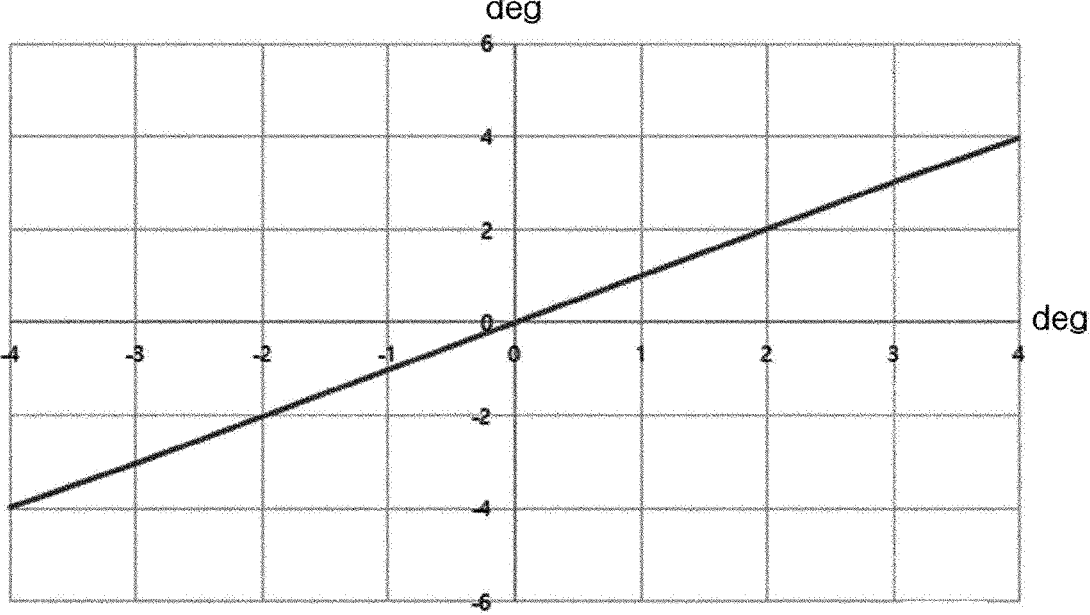

[FIG. 15A]
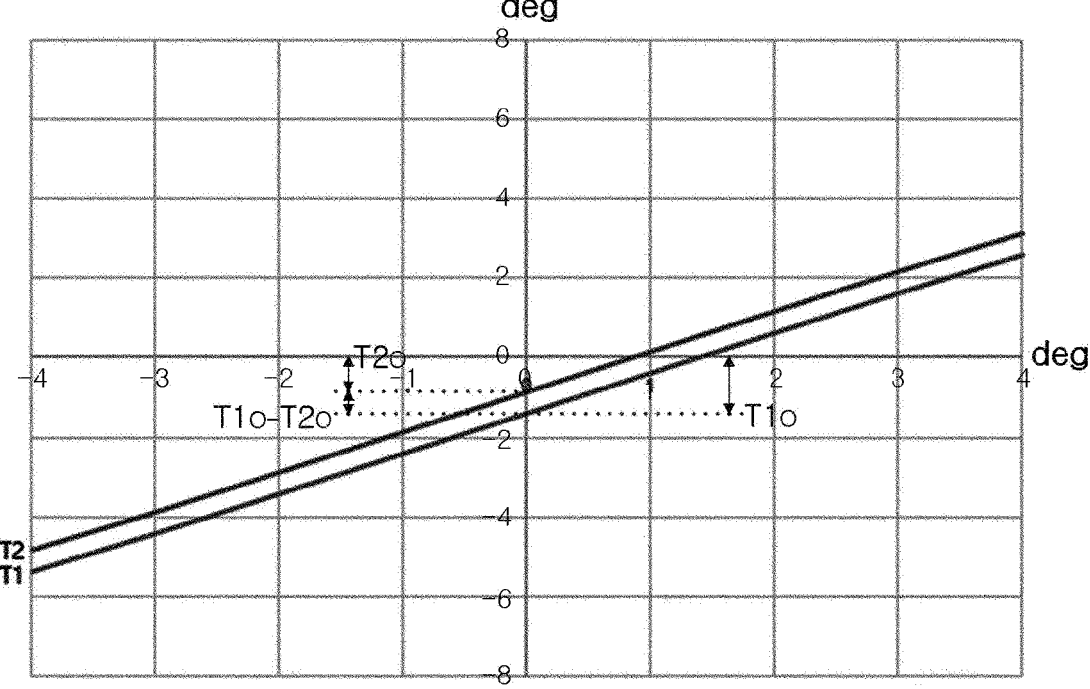
[FIG. 15B]
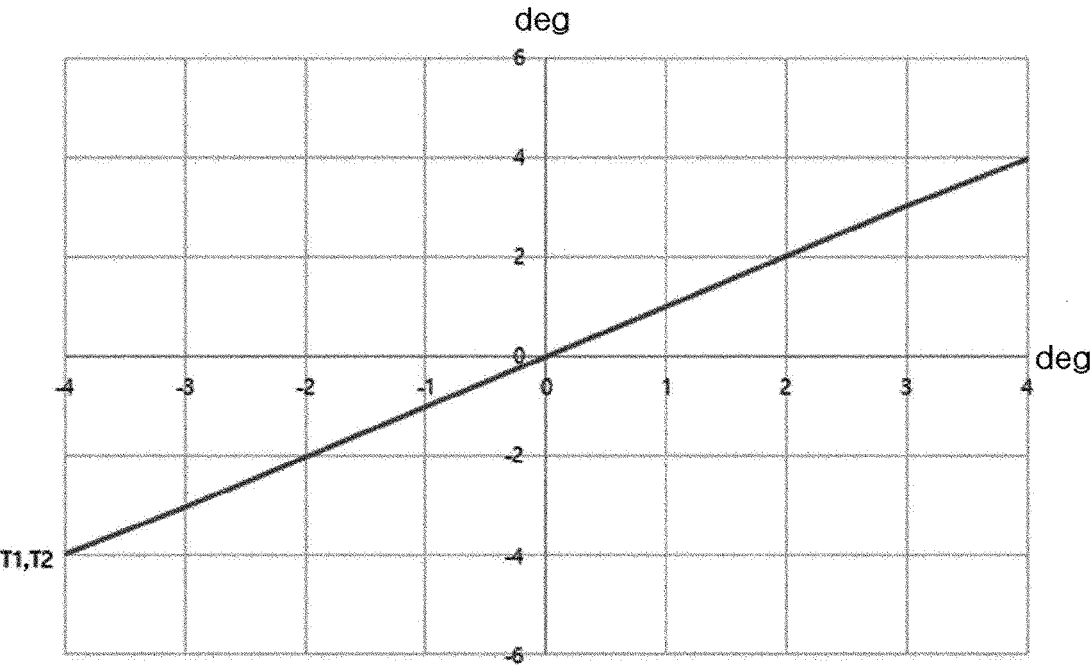

[FIG. 16]
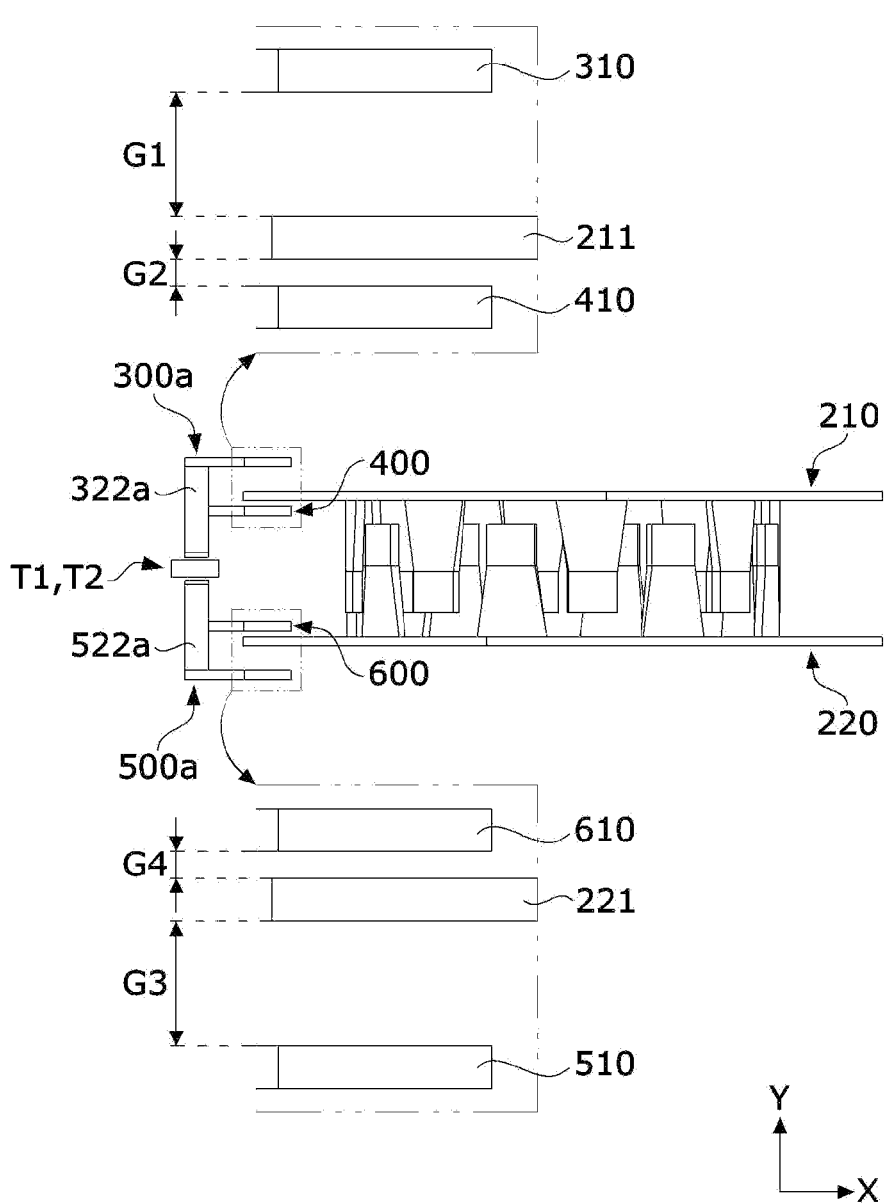

[FIG. 17A]
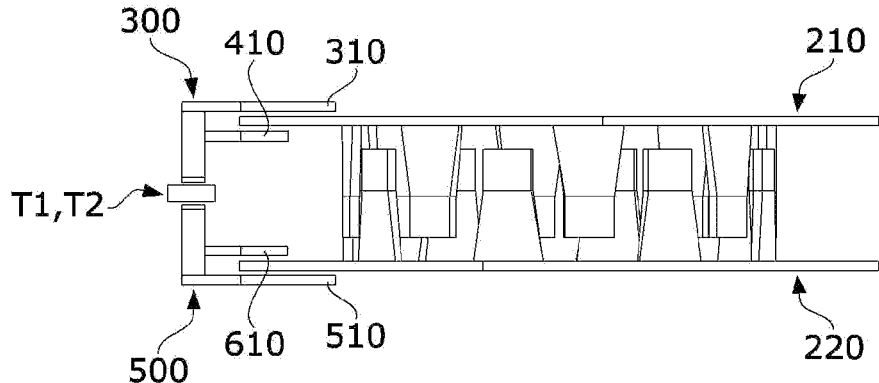
[FIG. 17B]
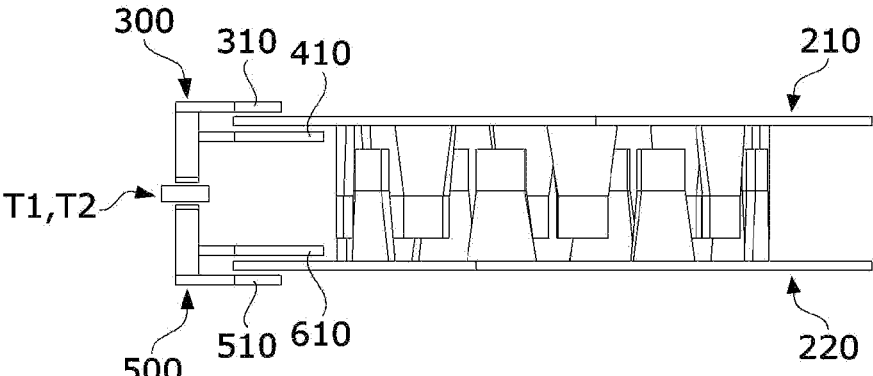

SENSING APPARATUS FOR DETECTING INTENSITY OF AN EXTERNAL MAGNETIC FIELD AND COMPENSATING FOR AN AMOUNT OF CHANGE OF A SENSOR OUTPUT

CROSS-REFERENCE TO RELATED PATENT APPLICATIONS

This application is a U.S. National Stage Application under 35 U.S.C. § 371 of PCT Application No. PCT/KR2022/005035, filed Apr. 7, 2022, which claims priority to Korean Patent Application No. 10-2021-0083797, filed Jun. 28, 2021, whose entire disclosures are hereby incorporated by reference.

TECHNICAL FIELD

The present invention relates to a sensing apparatus.

BACKGROUND ART

A steering system that assists steering using separate power may be used in a vehicle to ensure the stability of steering of the vehicle. In particular, an electronic power steering system (EPS) with low power loss and high accuracy may be used in the vehicle.

The electric power steering system enables a driver to drive safely by ensuring turning stability and providing a rapid restoring force using an electronic control unit that controls a motor according to driving conditions and driver operation information detected by a speed sensor, a torque sensor, an angle sensor, and the like.

The electric power steering system includes a sensing apparatus for measuring a torque of a steering shaft, a steering angle, and the like, in order to provide an appropriate torque. Here, the sensing apparatus is an apparatus that measures the degree of twisting of the steering shaft. Further, the steering shaft may include an input shaft connected to a steering wheel, an output shaft connected to a power transmission configuration on a wheel side, a member connecting the input shaft and the output shaft, and the like.

The sensing apparatus may include a rotor, a stator including a stator tooth, a collector, a sensor, and the like. In this case, the collector may be disposed on an outer side of the stator tooth. Accordingly, there is a problem of affecting a magnetic flux value of the sensor since the collector performs a role as a passage for the external magnetic field when the magnetic field is generated from the outside.

Therefore, when the sensor is affected by the external magnetic field, a change occurs in an output value of the sensing apparatus, which causes a problem in that the degree of twisting of the steering shaft cannot be accurately measured.

DISCLOSURE

Technical Problem

An embodiment is directed to providing a sensing apparatus capable of detecting the intensity of an external magnetic field applied from the outside through a collector, and compensating for an amount of change in output value of a sensor by the external magnetism.

Technical Solution

The object is achieved by a sensing apparatus including a rotor, a stator disposed corresponding to the rotor, a first collector disposed on one surface of the stator, and a second collector disposed below the first collector, in which the stator includes a stator tooth that includes a body and a tooth, the first collector includes a first body and a first leg, the second collector includes a second body and a second leg, the first body and the second body are separated from each other, the body of the stator tooth is disposed between the first body and the second body, and the first leg and the second leg do not overlap each other in an axial direction.

The object is achieved by a sensing apparatus including a rotor, a stator disposed corresponding to the rotor, a first collector disposed on one surface of the stator, and a second collector disposed below the first collector, in which the stator includes a first stator tooth and a second stator tooth that include a body and a tooth, the first collector includes a first body and a first leg, the second collector includes a second body and a second leg, the first body and the second body are separated from each other, the first body is disposed on an upper side of the body of the first stator tooth, the second body is disposed between the body of the first stator tooth and the body of the second stator tooth, and the first body and the second body are disposed to overlap each other in an axial direction.

The object is achieved by a sensing apparatus including a rotor, a stator disposed corresponding to the rotor, a first collector disposed on one surface of the stator, and a second collector disposed below the first collector, in which the stator includes a first stator tooth and a second stator tooth that include a body and a tooth, the first collector includes a first body and a first leg, the second collector includes a second body and a second leg, the first body and the second body are separated, the body of the stator tooth is disposed between the first body and the second body, and an axial height (H1) of the first leg is greater than an axial height (H2) of the second leg.

Advantageous Effects

In an embodiment, external magnetic field intensity can be detected using a plurality of collectors disposed to form different magnetic resistances.

In an embodiment, the performance of a sensing apparatus can be secured by compensating for an amount of change in output value by external magnetism using a plurality of collectors disposed to form different magnetic resistances.

In an embodiment, even if external magnetism increases significantly, the magnitude of a compensation value can be reduced using a difference value of a magnetic flux value.

In an embodiment, an amount of change in output value by external magnetism can be compensated for without significantly modifying an existing collector structure.

DESCRIPTION OF DRAWINGS

FIG. 1 is a perspective view illustrating a sensing apparatus according to an embodiment, FIG. 2 is an exploded perspective view illustrating the sensing apparatus according to the embodiment, FIG. 3 is a perspective view illustrating a disposition relationship of a stator tooth, a collector, and a sensor of the sensing apparatus according to the embodiment, FIG. 4 is a front view illustrating the disposition relationship of the stator tooth, the collector, and the sensor of the sensing apparatus according to the embodiment, FIG. 5 is a side view illustrating the disposition relationship of the stator tooth, the collector, and the sensor of the sensing apparatus according to the embodiment, FIG. 6 is a plan view illustrating the disposition relationship of the stator tooth, the collector, and the sensor of the sensing apparatus according to the embodiment, FIG. 7 is a front view illustrating a disposition relationship of the collector, and the sensor of the sensing apparatus according to the embodiment, FIG. 8 is a perspective view illustrating a first collector of the sensing apparatus according to the embodiment, FIG. 9 is a perspective view illustrating a second collector of the sensing apparatus according to the embodiment, FIG. 10 is a perspective view illustrating a third collector of the sensing apparatus according to the embodiment, FIG. 11 is a perspective view illustrating a fourth collector of the sensing apparatus according to the embodiment, FIGS. 12A and 12B are a set of graphs illustrating a process of converting sensitivity of a first sensor and sensitivity of a second sensor in a condition where no external magnetism is present, FIGS. 13A and 13B are a set of graphs illustrating a process of converting the sensitivity of the first sensor and the sensitivity of the second sensor in a condition where external magnetism is present, FIGS. 14A and 14B are a set of graphs comparing a sensing value of the first sensor and a sensing value of the second sensor in the absence of the external magnetism, FIGS. 15A and 15B are a set of graphs comparing a sensing value of the first sensor and the sensing value of the second sensor when the external magnetism is formed, FIG. 16 is a side view illustrating another embodiment of the disposition relationship of the stator tooth, the collector, and the sensor of the sensing apparatus according to the embodiment, and FIGS. 17A and 17B are a set of side views illustrating still another embodiment of the disposition relationship of the stator tooth, the collector, and the sensor of the sensing apparatus according to the embodiment.

MODES OF THE INVENTION

Hereinafter, exemplary embodiments of the present invention will be described in detail with reference the accompanying drawings. However, the present invention is not limited to some embodiments which will be described and may be embodied in a variety of different forms, and at least one or more components of the embodiments may be selectively combined, substituted.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, in the detailed description of the example embodiments of the invention with reference to the accompanying drawings, components that are the same or correspond to each other will be denoted by the same reference numerals in all of the figures, and redundant descriptions will be omitted.

A sensing apparatus according to an embodiment may be disposed between an output shaft (not shown) and an input shaft (not shown) of steering shafts. In this case, the output shaft may be called a first shaft, and the input shaft may be called a second shaft.

FIG. 1 is a perspective view illustrating a sensing apparatus according to an embodiment, FIG. 2 is an exploded perspective view illustrating the sensing apparatus according to the embodiment, FIG. 3 is a perspective view illustrating a disposition relationship of a stator tooth, a collector, and a sensor of the sensing apparatus according to the embodiment, FIG. 4 is a front view illustrating the disposition relationship of the stator tooth, the collector, and the sensor of the sensing apparatus according to the embodiment, FIG. 5 is a side view illustrating the disposition relationship of the stator tooth, the collector, and the sensor of the sensing apparatus according to the embodiment, FIG. 6 is a plan view illustrating the disposition relationship of the stator tooth, the collector, and the sensor of the sensing apparatus according to the embodiment, and FIG. 7 is a front view illustrating a disposition relationship of the collector, and the sensor of the sensing apparatus according to the embodiment. Here, an X direction illustrated in FIG. 1, and FIGS. 3 to 5 may mean a radial direction, and a Y direction may mean an axial direction. Further, the axial direction and the radial direction may be perpendicular to each other. Further, a direction defined along a circle having a radius in the radial direction based on an axial center may be referred to as a circumferential direction. In addition, reference numeral "C" illustrated in FIGS. 1 and 2 may mean a rotational center (an axial center) of a rotor 100 and a stator 200.

With reference to FIGS. 1 and 2, a sensing apparatus according to an embodiment may include the rotor 100 connected to a first shaft, the stator 200 connected to a second shaft and including a pair of stator teeth 210 and 220, a plurality of collectors 300, 400, 500, and 600 disposed corresponding to the stator teeth 210 and 220, and a plurality of sensors T1 and T2 disposed corresponding to one side of each of the collectors 300, 400, 500, and 600. Further, the sensing apparatus may include a circuit board 700 on which the sensors T1 and T2 are disposed.

With reference to FIGS. 3 to 5, the collectors 300, 400, 500, and 600 may include an outer collector disposed on an outer side of the pair of stator teeth 210 and 220 in the axial direction, and an inner collector disposed on an inner side of the pair of stator teeth 210 and 220 in the axial direction. In this case, a first sensor T1 may be disposed corresponding to the outer collector, and a second sensor T2 may be disposed corresponding to the inner collector. Here, the inner collector is a collector that is relatively less affected by external magnetism in the disposition, and the outer collector is a collector that is relatively more affected by the external magnetism in the disposition. Accordingly, a difference between sensing values by the outer collector and the inner collector may be used to compensate for an amount of change in sensing value caused by an external magnetic field.

Therefore, when a magnetic field is generated from the outside, each of the first sensor T1 and the second sensor T2 measures a different sensing value. Accordingly, the sensing apparatus may secure the measurement precision of the sensing apparatus by using a difference in the sensing value measured by each of the first sensor T1 and the second sensor T2 to compensate for the amount of change in sensing value caused by the external magnetic field.

The rotor 100 may be rotatably disposed on an inner side of the stator 200. Further, the rotor 100 may be connected to the first shaft, which is an input shaft of the steering shaft. In this case, the input shaft may be a steering shaft connected to a steering wheel of a vehicle. Here, the term "inner side"

may mean a direction toward a center C based on the radial direction, and the term "outer side" may mean a direction opposite to the inner side.

With reference to FIG. 2, the rotor 100 may include a holder 110 and a magnet 120 disposed on an outer side of the holder 110.

The holder 110 may be coupled to the first shaft. Accordingly, the holder 110 may rotate in conjunction with the rotation of the first shaft.

The magnet 120 may be disposed on the outer side of the holder 110. Here, the magnet 120 may be adhesively fixed or press-fixed to an outer circumferential surface of the holder 110. Accordingly, the magnet 120 may rotate in conjunction with the rotation of the holder 110.

The stator 200 may be rotatably disposed on an outer side of the rotor 100. Further, the stator 200 may be connected to the second shaft, which is an output shaft.

The stator 200 may include a first stator tooth 210, a second stator tooth 220, and a holder (not illustrated) to which the first stator tooth 210 and the second stator tooth 220 are coupled. Here, the holder of the stator 200 may be formed of a synthetic resin material, such as a mold, and may be coupled to the second shaft. Accordingly, the holder of the stator 200 may rotate in conjunction with the rotation of the second shaft.

The first stator tooth 210 may include a body 211 and a plurality of teeth 212 that protrude from the body 211 in the axial direction.

The body 211 may be formed in the shape of a disk with a hole formed in a center thereof or the shape of a ring. Further, the tooth 212 may be formed in plural so as to protrude from an inner circumferential surface of the body 211 in the axial direction. Further, the teeth 212 may be spaced apart from each other in a circumferential direction. Here, the body 211 of the first stator tooth 210 may be referred to as a first tooth body, and the tooth 212 of the first stator tooth 210 may be referred to as a first tooth.

The second stator tooth 220 may include a body 221 and a plurality of teeth 222 that protrude from the body 221 in the axial direction.

The body 221 may be formed in the shape of a disk with a hole formed in a center thereof or the shape of a ring. Further, the tooth 222 may be formed in plural so as to protrude from an inner circumferential surface of the body 221 in the axial direction. Further, the teeth 212 may be spaced apart from each other in a circumferential direction. As illustrated in FIG. 3, the tooth 212 of the first stator tooth 210 and the tooth 222 of the second stator tooth 220 may be disposed alternately in the circumferential direction. Here, the body 221 of the second stator tooth 220 may be referred to as a second tooth body, and the tooth 222 of the second stator tooth 220 may be referred to as a second tooth.

The plurality of collectors allow the sensors T1 and T2 disposed on the circuit board 700 to detect a change in magnetic force generated by a difference in rotation due to the twisting of the input shaft and the output shaft.

With reference to FIGS. 1 to 7, the plurality of collectors may be disposed corresponding to each of the pair of stator teeth 210 and 220 to collect the flux of the stator 200. Here, the collector may be formed of a metallic material and may be fixed to a housing (not illustrated). Further, the collector may be divided into an outer collector and an inner collector in dispositional relation to the pair of stator teeth 210 and 220.

Here, the outer collector may include a first collector 300 and a third collector 500. Further, the inner collector may include a second collector 400 and a fourth collector 600.

Accordingly, the pair of stator teeth 210 and 220 may be disposed between the first collector 300 and the third collector 500 in the axial direction. In addition, the second collector 400 and the fourth collector 600 may be disposed between the pair of stator teeth 210 and 220 in the axial direction.

The first collector 300 may be disposed corresponding to the first stator tooth 210 and the first sensor T1. For example, one side of the first collector 300 may be disposed on an upper side of the body 211 of the first stator tooth 210. Further, the other side of the first collector 300 may be disposed to face the first sensor T1. Here, the first collector 300 constitutes one of the outer collectors and is a collector that is relatively more affected by the external magnetism.

FIG. 8 is a perspective view illustrating a first collector of the sensing apparatus according to the embodiment.

With reference to FIG. 8, the first collector 300 may include a first body 310 and a first leg 320. Here, the first body 310 and the first leg 320 may be integrally formed, and may be formed by cutting and bending a predetermined plate-shaped member.

The first body 310 may be formed in the shape of a plate. Further, the first body 310 may be disposed adjacent to an upper surface 211a that is one side of the body 211 of the first stator tooth 210. As illustrated in FIG. 5, a lower side of the first body 310 may be disposed to face the upper surface 211a of the body 211 of the first stator tooth 210. Accordingly, a portion of the first body 310 may be disposed to overlap the body 211 of the first stator tooth 210 in the axial direction. Here, the first body 310 may be referred to as a first plate.

The first leg 320 may extend to protrude from the first body 310 toward the first sensor T1. In this case, the first leg 320 may be formed corresponding to the first sensor T1.

The first leg 320 may include a first extension portion 321 extending from the first body 310 in the radial direction, a first bent portion 322 extending from the first extension portion 321 in the axial direction, and a first facing portion 323 extending from the first bent portion 322. In this case, the first facing portion 323 is disposed to face the first sensor T1.

The second collector 400 may be disposed corresponding to the first stator tooth 210 and the second sensor T2. For example, one side of the second collector 400 may be disposed on a lower side of the body 211 of the first stator tooth 210. Further, the other side of the second collector 400 may be disposed to face the second sensor T2. Here, the second collector 400 constitutes one of the inner collectors and is a collector that is relatively less affected by the external magnetism.

FIG. 9 is a perspective view illustrating a second collector of the sensing apparatus according to the embodiment.

With reference to FIG. 9, the second collector 400 may include a second body 410 and a second leg 420. Here, the second body 410 and the second leg 420 may be integrally formed, and may be formed by cutting and bending a predetermined plate-shaped member.

The second body 410 may be formed in the shape of a plate. Further, the second body 410 may be disposed adjacent to a lower surface 211b that is one side of the body 211 of the first stator tooth 210. As illustrated in FIG. 5, an upper side of the first body 410 may be disposed to face the lower surface 211b of the body 211 of the first stator tooth 210. Accordingly, a portion of the second body 410 may be disposed to overlap the body 211 of the first stator tooth 210 in the axial direction. Here, the second body 410 may be referred to as a second plate.

The second leg 420 may extend to protrude from the second body 410 toward the second sensor T2. In this case, the second leg 420 may be formed corresponding to the second sensor T2.

The second leg 420 may include a second extension portion 421 extending from the second body 410 in the radial direction, a second bent portion 422 extending from the second extension portion 421 in the axial direction, and a second facing portion 423 extending from the second bent portion 422. In this case, the second facing portion 423 is disposed to face the second sensor T2.

The third collector 500 may be disposed corresponding to the second stator tooth 220 and the first sensor T1. For example, one side of the third collector 500 may be disposed on a lower side of the body 221 of the second stator tooth 220. Further, the other side of the third collector 500 may be disposed to face the first sensor T1. Here, the third collector 300 constitutes one of the outer collectors and is a collector that is relatively more affected by the external magnetism.

FIG. 10 is a perspective view illustrating the third collector of the sensing apparatus according to the embodiment.

With reference to FIG. 10, the third collector 500 may include a third body 510 and a third leg 520. Here, the third body 510 and the third leg 520 may be integrally formed, and may be formed by cutting and bending a predetermined plate-shaped member. Further, the third collector 500 may be disposed symmetrically with the first collector 300 with respect to the first sensor T1. Accordingly, the first leg 320 of the first collector 300 and the third leg 520 of the third collector 500 may be disposed to overlap each other in the axial direction. Further, the respective ends of the first leg 320 of the first collector 300 and the third leg 520 of the third collector 500 are disposed to be spaced apart in the axial direction.

The third body 510 may be formed in the shape of a plate. Further, the third body 510 may be disposed adjacent to a lower surface 221b that is one side of the body 221 of the second stator tooth 220. As illustrated in FIG. 5, an upper side of the third body 510 may be disposed to face the lower surface 221b of the body 221 of the second stator tooth 220. Accordingly, a portion of the third body 510 may be disposed to overlap the body 221 of the second stator tooth 220 in the axial direction. Here, the third body 510 may be referred to as a third plate.

The third leg 520 may extend to protrude from the third body 510 toward the first sensor T1. In this case, the third leg 520 may be formed corresponding to the first sensor T1.

The third leg 520 may include a third extension portion 521 extending from the third body 510 in the radial direction, a third bent portion 522 extending from the third extension portion 521 in the axial direction, and a third facing portion 523 extending from the third bent portion 522. In this case, the third facing portion 523 is disposed to face the first sensor T1.

The fourth collector 600 may be disposed corresponding to the second stator tooth 220 and the second sensor T2. For example, one side of the fourth collector 600 may be disposed on an upper side of the body 221 of the second stator tooth 220. Further, the other side of the fourth collector 600 may be disposed to face the second sensor T2. Here, the fourth collector 600 constitutes one of the inner collectors and is a collector that is relatively less affected by the external magnetism.

FIG. 11 is a perspective view illustrating a fourth collector of the sensing apparatus according to the embodiment.

With reference to FIG. 11, the fourth collector 600 may include a fourth body 610 and a fourth leg 620. Here, the fourth body 610 and the fourth leg 620 may be integrally formed, and may be formed by cutting and bending a predetermined plate-shaped member. Further, the fourth collector 600 may be disposed symmetrically with the second collector 400 with respect to the second sensor T2. Accordingly, the second leg 420 of the second collector 400 and the fourth leg 620 of the fourth collector 600 may be disposed to overlap each other in the axial direction. Further, the respective ends of the second leg 420 of the second collector 400 and the fourth leg 620 of the fourth collector 600 are disposed to be spaced apart in the axial direction.

The fourth body 610 may be formed in the shape of a plate. Further, the fourth body 610 may be disposed adjacent to an upper surface 221a that is one side of the body 221 of the second stator tooth 220. As illustrated in FIG. 5, a lower side of the fourth body 610 may be disposed to face the upper surface 221a of the body 221 of the second stator tooth 220. Accordingly, a portion of the fourth body 610 may be disposed to overlap the body 221 of the second stator tooth 220 in the axial direction. Here, the fourth body 610 may be referred to as a fourth plate.

The fourth leg 620 may extend to protrude from the fourth body 610 toward the second sensor T2. In this case, the fourth leg 620 may be formed corresponding to the second sensor T2.

The fourth leg 620 may include a fourth extension portion 621 extending from the fourth body 610 in the radial direction, a fourth bent portion 622 extending from the fourth extension portion 621 in the axial direction, and a fourth facing portion 623 extending from the fourth bent portion 622. In this case, the fourth facing portion 623 is disposed to face the second sensor T2.

Each of the first sensor T1 and the second sensor T2 may detect a change in magnetic field that is generated between the rotor 100 and the stator 200. Here, the first sensor T1 and the second sensor T2 may be a Hall IC. Accordingly, the sensing apparatus may measure a torque based on the detected change in magnetic field.

The first sensor T1 and the second sensor T2 may be disposed to be spaced apart from each other so as to have a predetermined spacing on one circuit board 700. In this case, the first sensor T1 and the second sensor T2 may be disposed on the same imaginary horizontal plane. Here, the circuit board 700 may be disposed on an outer side of the stator 200 in the radial direction.

Further, the first sensor T1 may be disposed between the first leg 320 of the first collector 300 and the third leg 520 of the third collector 500 in the axial direction.

Further, the second sensor T2 may be disposed between the second leg 420 of the second collector 400 and the fourth leg 620 of the fourth collector 600 in the axial direction.

Hereinafter, the dispositional relationship of the plurality of collectors 300, 400, 500, and 600 with the bodies 211 and 221 of the stator teeth 210 and 220, and the dispositional relationship between the collectors 300, 400, 500, and 600 will be described, and an effect of the external magnetism on each of the sensors T1 and T2 and the compensation through a difference in sensing values measured at each of the sensors T1 and T2 will be described.

With reference to FIGS. 3 to 5, the sensing apparatus may include the bodies 211 and 221 of the pair of stator teeth 210 and 220 disposed to be spaced apart in the axial direction. Further, the sensing apparatus may include the outer collector disposed on an outer side and the inner collector disposed on an inner side in the axial direction with respect to the bodies 211 and 221 of the pair of stator teeth 210 and 220. Here, the first collector 300 and the third collector 500 may be provided as the outer collector, and the second collector 400 and the fourth collector 600 may be provided as the inner collector.

The second body 410 of the second collector 400 may be disposed below the first body 310 of the first collector 300 in the axial direction. Further, the body 211 of the first stator tooth 210 may be disposed between the first body 310 of the first collector 300 and the second body 410 of the second collector 400 in the axial direction. Further, the second body 410 of the second collector 400 may be disposed between the body 211 of the first stator tooth 210 and the body 221 of the second stator tooth 220. In this case, the first body 310 may be disposed to be spaced apart from the upper surface 211*a* of the body 211 of the first stator tooth 210 by a predetermined first gap G1. Further, the second body 410 may be disposed to be spaced apart from the lower surface 211*b* of the body 211 of the first stator tooth 210 by a predetermined second gap G2. That is, the first body 310 and the second body 410 may be disposed to be physically separated from each other. Here, the first body 310 may be formed to have a predetermined axial thickness t.

Further, the first body 310 and the second body 410 may be formed to have an identical horizontal area, and the first body 310 and the second body 410 may be disposed to overlap each other in the axial direction.

Accordingly, with reference to FIG. 6, the sensing apparatus may include an overlap region A and a non-overlap region formed in the axial direction. Here, the overlap region A may be a region in which at least two of the body 211 of the first stator tooth 210, the first collector 300, and the second collector 400 overlap each other in the axial direction, and the non-overlap region may be a region in which each of the body 211 of the first stator tooth 210, the first collector 300, and the second collector 400 does not overlap each other in the axial direction.

The overlap region A may include a first overlap region A1 and a second overlap region A2. Here, the first overlap region A1 may be a region in which all of the body 211 of the first stator tooth 210, the first body 310 of the first collector 300, and the second body 410 of the second collector 400 overlap each other in the axial direction. Further, the second overlap region A2 may be a region in which only the first body 310 of the first collector 300 and the second body 410 of the second collector 400 overlap each other in the axial direction. Therefore, the overlap region A may represent a region in which the first body 310 of the first collector 300 and the second body 410 of the second collector 400 overlap each other in the axial direction.

The non-overlap region may be a region in which at least one of the body 211 of the first stator tooth 210, the first collector 300, and the second collector 400 does not overlap the other in the axial direction. For example, the first leg 320 of the first collector 300 and the second leg 420 of the second collector 400 may be disposed so as not to overlap each other in the axial direction. Accordingly, the non-overlap region of the sensing apparatus may include the first leg 320 of the first collector 300 and the second leg 420 of the second collector 400.

Meanwhile, the body 221 of the second stator tooth 220, the third collector 500, and the fourth collector 600 of the sensing apparatus may be disposed symmetrically with the body 211 of the first stator tooth 210, the first collector 300, and the second collector 400 with respect to an imaginary horizontal plane. Here, the horizontal plane may be a plane passing through an axial center of the stator 200 in a horizontal direction (the radial direction).

The fourth body 610 of the fourth collector 600 may be disposed above the third body 510 of the third collector 500 in the axial direction. Further, the body 221 of the second stator tooth 220 may be disposed between the third body 510 of the third collector 500 and the fourth body 610 of the fourth collector 600 in the axial direction. In this case, the third body 510 may be disposed to be spaced apart from the lower surface 221*b* of the body 221 of the second stator tooth 220 by a predetermined third gap G3. Further, the fourth body 610 may be disposed to be spaced apart from the upper surface 221*a* of the body 221 of the second stator tooth 220 by a predetermined fourth gap G4. Here, the second body 410 may be formed to have a predetermined axial thickness t.

In addition, the body 221 of the second stator tooth 220, the third collector 500, and the fourth collector 600 may also be disposed such that the overlap region A and the non-overlap region are formed. Here, the detailed description of the overlap region A and the non-overlap region by the body 221 of the second stator tooth 220, the third collector 500, and the fourth collector 600 can be described by the overlap region A and the non-overlap region of the body 211 of the first stator tooth 210, the first collector 300, and the second collector 400, and therefore will be omitted.

With reference to FIG. 7, the first leg 320 of the first collector 300 and the third leg 520 of the third collector 500 may be disposed such that a fifth gap G5 is formed in the axial direction.

Further, the second leg 420 of the second collector 400 and the fourth leg 620 of the fourth collector 600 may be disposed such that a sixth gap G6 is formed in the axial direction. Here, the fifth gap G5 and the sixth gap G6 may serve as a magnetic resistance, and may have the same size.

In addition, the first body 310 of the first collector 300 and the second body 410 of the second collector 400 below the first body 310 may be disposed such that a seventh gap G7 is formed in the axial direction. In this case, since the first body 310 is disposed to overlap the second body 410 in the axial direction, the first body 310 may perform a role as a barrier against the external magnetism. Accordingly, the external magnetism may be guided to the leg 320 of the first collector 300. Here, a size of the seventh gap G7 may be a sum of the first gap G1, the second gap G2, and the axial thickness t of the body 211 of the first stator tooth 210.

Further, the third body 510 of the third collector 500 and the fourth body 610 of the fourth collector 600 may be disposed such that an eighth gap G8 is formed in the axial direction. In this case, since the third body 510 is disposed to overlap the fourth body 610 in the axial direction, the third body 510 may perform a role as a barrier against the external magnetism. Accordingly, the external magnetism may be guided to the leg 520 of the third collector 500. Further, a size of the eighth gap G8 may be a sum of the third gap G3, the fourth gap G4, and the axial thickness t of the body 221 of the second stator tooth 220.

Here, the seventh gap G7 and the eighth gap G8 may serve as a magnetic resistance, and may have the same size.

As illustrated in FIG. 7, when the external magnetism is formed, the external magnetism flows through a first path P1 formed along the first body 310, the first leg 320, the first sensor T1, and the third leg 520. In addition, the external magnetism flows through a second path P2 formed along the first body 310, the second body 410, the second leg 420, the second sensor T2, and the fourth leg 620.

While only the magnetic resistance due to the fifth gap G5 exists in the first path P1, the magnetic resistance due to the seventh gap G7 further exists in the second path P2 in addition to the sixth gap G6. Therefore, relatively more magnetic flux flows through the first path P1. Accordingly, in response to the external magnetism, a difference between a sensing value measured by the first sensor T1 and a sensing value measured by the second sensor T2 occurs.

Although not illustrated in the drawings, when the external magnetism is generated on a lower side of the third collector 500, a flow of magnetic flux may be formed in the third collector 500 and the fourth collector 600, like the case of the first collector 300 and the second collector 400 described above. Accordingly, a difference between a sensing value measured by the first sensor T1 and a sensing value measured by the second sensor T2 occurs.

This first collector 300 is firstly disposed such that the first body 310 is disposed to overlap a top of the second body 410 to induce the external magnetism that is about to flow toward the second leg 420 to flow toward the first leg 310, and secondly, through the seventh gap G7 formed between the first body 310 and the second body 420, further forms a resistance to the external magnetism to make a difference between the sensing value measured by the first sensor T1 and the sensing value measured by the second sensor T2. This is the same for the third collector 500.

Meanwhile, an axial length of the first leg 320 is greater than an axial length of the second leg 420. In detail, an axial length L1 of the first bent portion 322 of the first leg 320 may be formed to be greater than an axial length L2 of the second bent portion 422 of the second leg 420. Accordingly, an axial height H1 of the first leg 320 may be formed greater than an axial height H2 of the second leg 420 with respect to an upper surface of the sensors T1 and T2.

In addition, an axial length of the third leg 520 is greater than an axial length of the fourth leg 620. In detail, an axial length L3 of the third bent portion 522 of the third leg 520 may be formed to be greater than an axial length L4 of the fourth bent portion 622 of the fourth leg 620. Accordingly, an axial height H3 of the third leg 520 may be formed greater than an axial height H4 of the fourth leg 620 with respect to a lower surface of the sensors T1 and T2.

In the sensing apparatus, a process of compensating the sensing value of the first sensor T1 and the sensing value of the second sensor T2 in response to the external magnetism is as follows.

The sensing value of the first sensor T1 is compensated by Equation 1 below.

$$T1c = T1o - a*(T2o - T1o) \qquad \text{[Equation 1]}$$

Here, T1c is a compensated sensing value of the first sensor T1, T1o is an uncompensated sensing value of the first sensor T1, T2o is an uncompensated sensing value of the second sensor T2, and a is a compensation factor corresponding to an axial spaced distance (seventh gap G7) of the first collector 300 and the second collector 400 in the first sensor T1.

Further, the sensing value of the second sensor T2 is compensated by Equation 2 below.

$$T2c = T2o - b*(T2o - T1o) \qquad \text{[Equation 2]}$$

Here, T2c is a compensated sensing value of the second sensor T2, T1o is an uncompensated sensing value of the first sensor T1, T2o is an uncompensated sensing value of the second sensor T2, and b is a compensation factor corresponding to an axial spaced distance (seventh gap G7) of the first collector 300 and the second collector 400 in the second sensor T2.

a and b may be preset values, corresponding to the seventh gap G7. Here, a and b may vary depending on shapes of the first collector 300 and the second collector 400.

FIG. 12 is a set of graphs illustrating a process of compensating sensitivity of the first sensor T1 and sensitivity of the second sensor T2 in a condition where no external magnetism is present. As illustrated in FIG. 12A, in the condition of no external magnetism, the first sensor T1 and the second sensor T2 have different sensitivities in response to the magnetic flux.

The sensitivity of the first sensor T1 may be lower than the sensitivity of the second sensor T2. In this case, as illustrated in FIG. 12B, the sensitivity of the first sensor T1 and the sensitivity of the second sensor T2 in the condition of no external magnetism may be converted into a process of outputting the sensing value (an output angle) of the first sensor T1 and the sensing value (an output angle) of the second sensor T2.

FIG. 13 is a set of graphs illustrating a process of compensating sensitivity of the first sensor T1 and sensitivity of the second sensor T2 in a condition where the external magnetism is present.

As illustrated in FIG. 13A, in the case of the presence of the external magnetism, the first sensor T1 and the second sensor T2 are affected by the external magnetism. Therefore, an offset O1 occurs in the first sensor T1 and a relatively small offset O2 occurs in the second sensor T2. Therefore, in the condition with the external magnetism, as illustrated in FIG. 13B, an offset occurs in the sensing value T1o of the first sensor T1 and the sensing value T2o of the second sensor T2, respectively, even after the sensitivity of the first sensor T1 and the sensitivity of the second sensor T2 are converted.

Due to this offset, the sensing value T1o of the first sensor T1 and the sensing value T2o of the second sensor T2 have a constant difference value T1o-T2o throughout an entire range of the angle.

FIG. 14 is a set of graphs comparing the sensing value of the first sensor T1 and the sensing value of the second sensor T2 in the case of no external magnetism, FIG. 14A illustrates the sensing value of the first sensor T1 and the sensing value of the second sensor T2 before the compensation, and FIG. 14B illustrates the sensing value of the first sensor T1 and the sensing value of the second sensor T2 after the compensation.

In the case of no external magnetism, as can be seen from Equations 1 and 2, since the sensing value of the first sensor T1 and the sensing value of the second sensor T2 are the same, that is, T2o-T1o becomes 0, it can be seen that the sensing value of the first sensor T1 before the compensation and the sensing value of the first sensor T1 after the compensation are the same. Further, it can be seen that the sensing value of the second sensor T2 before the compensation and the sensing value of the second sensor T2 after the compensation are the same.

FIG. 15 is a set of graphs comparing the sensing value of the first sensor T1 and the sensing value of the second sensor T2 in the case in which the external magnetism is formed, FIG. 15A illustrates the sensing value of the first sensor T1 and the sensing value of the second sensor T2 before the compensation, and FIG. 15B illustrates the sensing value of the first sensor T1 and the sensing value of the second sensor T2 after the compensation.

In the case in which the external magnetism is formed, the difference value T2o-T1o between the sensing value of the first sensor T1 and the sensing value of the second sensor T2 is detected. Further, when the compensated sensing value of the first sensor T1 is obtained using Equation 1 and the compensated sensing value of the second sensor T2 is obtained using Equation 2, it can be seen that the compensated sensing value of the first sensor T1 and the compensated sensing value of the second sensor T2 coincide and are compensated without causing offset, as illustrated in FIG. 15B.

FIG. 16 is a side view illustrating another embodiment of the disposition relationship of the stator tooth, the collector, and the sensor of the sensing apparatus according to the embodiment.

When comparing the sensing apparatus illustrated in FIG. 5 to the sensing apparatus illustrated in FIG. 16, there is a difference in the axial positions of the first body 310 of the first collector 300 and the third body 510 of the third collector 500. Here, a first collector 300a of the sensing apparatus illustrated in FIG. 16 may include the first body 310 and a first leg 320a, in which the first leg 320a may include the first extension portion 321, a first bent portion 322a, and the first facing portion 323. In addition, a third collector 500a may include the third body 510 and a third leg 520a, in which the third leg 520a may include the third extension portion 521, a third bent portion 522a, and the third facing portion 523.

In detail, there is a difference in that an axial spaced distance of the first body 310 of the first collector 300a illustrated in FIG. 16 is greater than the axial spaced distance of the first body 310 of the first collector 300 illustrated in FIG. 5 with respect to the body 211 of the first stator tooth 210. That is, the modified example of the sensing apparatus illustrated in FIG. 16 differs in that the first bent portion 322a of the first collector 300a and the third bent portion 522a of the third collector 500a are longer.

Therefore, with respect to the body 211 of the first stator tooth 210, the first gap G1 between the body 211 and the first body 310 of the first collector 300a is formed to be greater than the second gap G2 between the body 211 and the second body 410 of the second collector 400. Accordingly, as the first gap G1 between the body 211 and the first body 310 of the first collector 300a becomes greater, the compensation factor of the equations above may be reduced. Further, a measurement error rate of the sensing apparatus may be reduced by reducing the compensation factor.

In addition, with respect to the body 221 of the second stator tooth 220, the third gap G3 between the body 221 and the third body 510 of the third collector 500a is formed to be greater than the fourth gap G4 between the body 221 and the fourth body 610 of the fourth collector 600. Accordingly, as the third gap G3 between the body 221 and the third body 510 of the third collector 500a becomes greater, the compensation factor of the equations above may be reduced. Further, a measurement error rate of the sensing apparatus may be reduced by reducing the compensation factor.

FIG. 17 is a set of side views illustrating still another embodiment of the dispositional relationship of the stator tooth, the collector, and the sensor of the sensing apparatus according to the embodiment, FIG. 17A is a view illustrating the sensing apparatus according to an embodiment in which an area of the first body of the first collector and the third body of the third collector is greater than an area of the second body of the second collector and the fourth body of the fourth collector, and FIG. 17B is a view illustrating the sensing apparatus according to an embodiment in which the area of the first body of the first collector and the third body of the third collector is smaller than the area of the second body of the second collector and the fourth body of the fourth collector.

With reference to FIG. 17, an area of the first body 310 of the first collector 300 may be different from an area of the second body 410 of the second collector 400. In addition, an area of the third body 510 of the third collector 500 may be different from an area of the fourth body 610 of the fourth collector 600. For example, the first body 310 and the second body 410 may be formed to have the same thickness, but may have different horizontal areas. In addition, the third body 510 and the fourth body 610 may be formed to have the same thickness, but may have different horizontal areas.

As illustrated in FIG. 17A, an area of the first body 310 of the first collector 300 and the third body 510 of the third collector 500 corresponding to the outer collector may be formed greater than an area of the second body 410 of the second collector 400 and the fourth body 610 of the fourth collector 600.

Accordingly, the area of the first body 310 of the first collector 300, which is relatively more affected by the external magnetism, may be largely formed, so that the external magnetism may be more reliably blocked from flowing to the second collector 400 side. In addition, the area of the third body 510 of the third collector 500, which is relatively more affected by the external magnetism, may be formed to be large, so that the external magnetism may be more reliably blocked from flowing to the fourth collector 600 side.

As illustrated in FIG. 17B, an area of the first body 310 of the first collector 300 and the third body 510 of the third collector 500, corresponding to the outer collector, may be formed to be smaller than an area of the second body 410 of the second collector 400 and the fourth body 610 of the fourth collector 600.

That is, in the sensing apparatus, a relative area of the second body 410 of the second collector 400 and the fourth body 610 of the fourth collector 600 that is relatively less affected by the external magnetism may be formed to be large in consideration of the measurement precision.

The sensing apparatus according to the embodiments described above can be used in a variety of devices for vehicles, home appliances, or the like.

DESCRIPTION OF REFERENCE NUMERALS

100: Rotor, 200: Stator, 210: First stator tooth, 220: Second stator tooth, 300: First collector, 310: First body, 320: First leg, 400: Second collector, 410: Second body, 420: Second leg, 500: Third collector, 510: Third body, 520: Third leg, 600: Fourth collector, 610: Fourth body, 620: Fourth leg, 700: Circuit board, T1: First sensor, T2: Second sensor

The invention claimed is:

1. A sensing apparatus comprising:

a rotor;

a stator disposed corresponding to the rotor;

a first collector disposed on one surface of the stator;

a second collector disposed below the first collector;

a first sensor disposed corresponding to the first collector, and a second sensor disposed corresponding to the second collector, wherein the stator includes a stator tooth that includes a body and a tooth, the first collector includes a first body and a first leg, the second collector includes a second body and a second leg, the first body and the second body are separated from each other, the body of the stator tooth is disposed between the first body and the second body, and the first leg and the second leg do not overlap each other in an axial direction, a sensing value of at least one of the first sensor and the second sensor is corrected based on a difference value between a sensing value of the first sensor and a sensing value of the second sensor, the sensing value of the first sensor is compensated with a compensation value calculated by Equation 1 below, $$T1c = T1o - a*(T2o - T1o) \qquad \text{[Equation 1]}$$

here, $T1c$ is a compensated sensing value of the first sensor, $T1o$ is an uncompensated sensing value of the first sensor, $T2o$ is an uncompensated sensing value of the second sensor, and a is a compensation factor corresponding to an axial spaced distance between the first collector and the second collector.

2. The sensing apparatus of claim 1, wherein the first leg includes a first extension portion extending from the first body in a radial direction, a first bent portion extending from the first extension portion in the axial direction, and a first facing portion extending from the first bent portion, and the second leg includes a second extension portion extending from the second body in the radial direction, a second bent portion extending from the second extension portion in the axial direction, and a second facing portion extending from the second bent portion, wherein an axial length (L1) of the first bent portion is greater than an axial length (L2) of the second bent portion.

3. The sensing apparatus of claim 2, wherein the first sensor is disposed to face the first facing portion and the second sensor is disposed to face the second facing portion.

4. The sensing apparatus of claim 1, wherein the first body and the second body are disposed to overlap each other in the axial direction.

5. The sensing apparatus of claim 1, wherein an area of the first body is different from an area of the second body.

6. The sensing apparatus of claim 1, wherein a first gap (G1) is formed between the body of the stator tooth and the first body and a second gap (G2) is formed between the body of the stator tooth and the second body, wherein the first gap (G1) is greater than the second gap (G2).

7. The sensing apparatus of claim 1, wherein the sensing value of the second sensor is compensated with a compensation value calculated by Equation 2 below, $$T2c = T2o - b*(T2o - T1o) \qquad \text{[Equation 2]}$$

here, $T2c$ is a compensated sensing value of the second sensor, $T1o$ is the uncompensated sensing value of the first sensor, $T2o$ is the uncompensated sensing value of the second sensor, and b is a compensation factor corresponding to the axial spaced distance between the first collector and the second collector.

8. The sensing apparatus of claim 1, wherein the stator tooth includes a first stator tooth and a second stator tooth, the first stator tooth includes a first tooth body and a first tooth, and the first tooth body is disposed between the first body and the second body.

9. The sensing apparatus of claim 8, further comprising a third collector and a fourth collector disposed corresponding to the second stator tooth, and wherein the second tooth body of the second stator tooth is disposed between a third body of the third collector and a fourth body of the fourth collector.

10. A sensing apparatus comprising:

a rotor;

a stator disposed corresponding to the rotor;

a first collector disposed on one surface of the stator;

a second collector disposed below the first collector;

a first sensor disposed corresponding to the first collector; and a second sensor disposed corresponding to the second collector, wherein the stator includes a first stator tooth and a second stator tooth that include a body and a tooth, the first collector includes a first body and a first leg, the second collector includes a second body and a second leg, the first body and the second body are separated from each other, the first body is disposed on an upper side of the body of the first stator tooth, the second body is disposed between the body of the first stator tooth and the body of the second stator tooth, and the first body and the second body are disposed to overlap each other in an axial direction, a sensing value of at least one of the first sensor and the second sensor is corrected based on a difference value between a sensing value of the first sensor and a sensing value of the second sensor, the sensing value of the first sensor is compensated with a compensation value calculated by Equation 1 below, $$T1c = T1o - a^*(T2o - T1o) \qquad \text{[Equation 1]}$$

here, $T1c$ is a compensated sensing value of the first sensor, $T1o$ is an uncompensated sensing value of the first sensor, $T2o$ is an uncompensated sensing value of the second sensor, and a is a compensation factor corresponding to an axial spaced distance between the first collector and the second collector.

11. The sensing apparatus of claim 10, wherein the first leg includes a first extension portion extending from the first body in a radial direction, a first bent portion extending from the first extension portion in the axial direction, and a first facing portion extending from the first bent portion, and the second leg includes a second extension portion extending from the second body in the radial direction, a second bent portion extending from the second extension portion in the axial direction, and a second facing portion extending from the second bent portion, wherein an axial length (L1) of the first bent portion is greater than an axial length (L2) of the second bent portion.

12. A sensing apparatus comprising:

a rotor;

a stator disposed corresponding to the rotor;

a first collector disposed on one surface of the stator;

a second collector disposed below the first collector;

a first sensor disposed corresponding to the first collector; and a second sensor disposed corresponding to the second collector, wherein the stator includes a first stator tooth and a second stator tooth that include a body and a tooth, the first collector includes a first body and a first leg, the second collector includes a second body and a second leg, the first body and the second body are separated, the body of the stator tooth is disposed between the first body and the second body, and an axial height (H1) of the first leg is greater than an axial height (H2) of the second leg, a sensing value of at least one of the first sensor and the second sensor is corrected based on a difference value between a sensing value of the first sensor and a sensing value of the second sensor, the sensing value of the first sensor is compensated with a compensation value calculated by Equation 1 below, $$T1c = T1o - a^*(T2o - T1o) \qquad \text{[Equation 1]}$$

here, T1c is a compensated sensing value of the first sensor, T1o is an uncompensated sensing value of the first sensor, T2o is an uncompensated sensing value of the second sensor, and a is a compensation factor corresponding to an axial spaced distance between the first collector and the second collector.

13. The sensing apparatus of claim 12, wherein the first leg includes a first extension portion extending from the first body in a radial direction, a first bent portion extending from the first extension portion in the axial direction, and a first facing portion extending from the first bent portion, and the second leg includes a second extension portion extending from the second body in the radial direction, a second bent portion extending from the second extension portion in the axial direction, and a second facing portion extending from the second bent portion, wherein an axial length (L1) of the first bent portion is greater than an axial length (L2) of the second bent portion.

14. The sensing apparatus of claim 12, wherein the first body and the second body are disposed to overlap each other in the axial direction.

15. The sensing apparatus of claim 12, wherein an area of the first body is different from an area of the second body.

16. The sensing apparatus of claim 12, wherein a first gap (G1) is formed between the body of the stator tooth and the first body and a second gap (G2) is formed between the body of the stator tooth and the second body, wherein the first gap (G1) is greater than the second gap (G2).

* * * * *